(12) United States Patent
Riis et al.

(10) Patent No.: US 7,043,431 B2
(45) Date of Patent: May 9, 2006

(54) MULTILINGUAL SPEECH RECOGNITION SYSTEM USING TEXT DERIVED RECOGNITION MODELS

(75) Inventors: Søren Riis, Ballerup (DK); Kåre Jean Jensen, Virum (DK); Morten With Pedersen, Copenhagen (DK)

(73) Assignee: Nokia Corporation, Espoo (FI)

( * ) Notice: Subject to any disclaimer, the term of this patent is extended or adjusted under 35 U.S.C. 154(b) by 541 days.

(21) Appl. No.: 09/942,609

(22) Filed: Aug. 31, 2001

(65) Prior Publication Data

US 2003/0050779 A1    Mar. 13, 2003

(51) Int. Cl.
*G10L 13/00* (2006.01)
*G10L 15/06* (2006.01)
*G10L 21/00* (2006.01)
*G06F 17/20* (2006.01)

(52) U.S. Cl. .................. 704/259; 704/243; 704/270; 704/8

(58) Field of Classification Search ................ 704/259, 704/231, 232, 254, 256, 243, 260
See application file for complete search history.

(56) References Cited

U.S. PATENT DOCUMENTS

| | | | | |
|---|---|---|---|---|
| 5,212,730 A | * | 5/1993 | Wheatley et al. ........... | 704/243 |
| 5,668,926 A | * | 9/1997 | Karaali et al. .............. | 704/232 |
| 5,930,754 A | * | 7/1999 | Karaali et al. .............. | 704/259 |
| 6,021,387 A | * | 2/2000 | Mozer et al. ................ | 704/232 |
| 6,029,132 A | * | 2/2000 | Kuhn et al. .................. | 704/260 |
| 6,085,160 A | * | 7/2000 | D'hoore et al. ............. | 704/256 |
| 6,363,342 B1 | * | 3/2002 | Shaw et al. .................. | 704/220 |
| 2002/0040296 A1 | * | 4/2002 | Kienappel ................... | 704/220 |
| 2002/0087317 A1 | * | 7/2002 | Lee et al. .................... | 704/257 |

OTHER PUBLICATIONS

Sproat, "Multilingual Text Analysis for Text-to-Speech Synthesis", 12th European Conference on Artificial Intelligence Workshop on Extended Finite State Models of Language, Budapest, Hungary, 75-81, 1996.*
Jensen et al., "Self-Organizing Letter Code-Book for Text-to-Phoneme Neural Network Model", *Proceedings of ICSLP*, 2000.
Palou et al., "Towards a Common Phone Alphabet for Multilingual Speech Recognition", *Proceedings of ICSLP*, pp. 1-1, 2000.
Viiki et al., "Speaker- and Language-Independent Speech Recognition in Mobile Communications Systems", *Proceedings of ICASSP*, 2001.
*An Advanced System to Generate Pronunciations of Proper Nouns*, N. Deshmukh et al.; Acoustics, IEEE International Conference, Munich, Germany, Apr. 1997, 5 pages.
*Pronunciation and Acoustic Model Adaptation for Improving Multilingual Speech Recognition*, J. Tian et al.; ITRW on Adaptation Methods for Speech Recognition, Aug. 2001.

* cited by examiner

*Primary Examiner*—Susan McFadden
*Assistant Examiner*—Brian L. Albertalli
(74) *Attorney, Agent, or Firm*—Alston & Bird LLP

(57) ABSTRACT

There is provided a novel approach for generating multilingual text-to-phoneme mappings for use in multilingual speech recognition systems. The multilingual mappings are based on the weighted output from a neural network text-to-phoneme model, trained on data mixed from several languages. The multilingual mappings used together with a branched grammar decoding scheme is able to capture both inter- and intra-language pronunciation variations which is ideal for multilingual speaker independent recognition systems. A significant improvement in overall system performance is obtained for a multilingual speaker independent name dialing task when applying multilingual instead of language dependent text-to-phoneme mapping.

25 Claims, 3 Drawing Sheets

MULTILINGUAL SPEECH RECOGNITION SYSTEM USING TEXT DERIVED RECOGNITION MODELS

BACKGROUND OF THE INVENTION

1. Field of the Invention

The invention relates to a novel approach for generating multilingual text-to-phoneme mappings for use in multilingual speech recognition systems.

2. Description of the Prior Art

Speaker independent command word recognition and name dialing on portable devices such as mobile phones and personal digital assistants has attracted significant interest recently. A speech recognition system provides an alternative to keypad input for limited size portable products. The speaker independence makes the system particularly attractive from a user point of view compared to speaker dependent systems. For large vocabularies, user training of a speaker dependent recognizer is likely to become too tedious to be useful.

How to build acoustic models that integrate multiple languages in automatic speech recognition applications is described by F. Palou, P. Bravetti, O. Emem, V. Fischer, and E. Janke, in the publication "Towards a Common Phone Alphabet for Multilingual Speech Recognition", In *Proceedings of ICSLP*, pages 1—1, 2000.

An architecture for embedded multilingual speech recognition systems is proposed by O. Viiki, I. Kiss, and J. Tian, in the publication "Speaker- and Language-independent Speech Recognition in Mobile Communication Systems", in *Proceedings of ICASSP*, 2001.

Use of neural networks for UP giving estimates of the posterior probabilities of the different phonemes for each letter input is taught by K. Jensen, and S. Riis, in the publication "Self-Organizing Letter Code-Book for Text-To-Phoneme Neural Network Model", published in *Proceedings of ICSL.P*, 2000.

A phoneme based speaker independent system is ready to use "out-of-the-box" and does not require any training session of the speaker. Furthermore, if the phoneme based recognizer is combined with a text-to-phoneme (TTP) mapping module for generating phoneme pronunciations online from written text, the user may define specific vocabularies as required in e.g. a name dialling application. Naturally, speaker and vocabulary independence comes at a cost, namely increased complexity for real-time decoding, increased requirements for model storage, and usually also a slight drop in recognition performance compared to speaker dependent systems. Furthermore, speaker independent systems typically contain a number of language dependent modules, e.g. language dependent acoustic phoneme models, TTP modules etc. For portable devices, the support of several languages may be prohibited by the limited memory available in such devices as separate modules need to be stored for each language.

Recently, systems based on multilingual acoustic phoneme models have emerged—see the letters written by Palou et al., and Viikiet al., mentioned above. These systems are designed to handle several different languages simultaneously and are based on the observation that many phonemes are shared among different languages. The basic idea in multilingual acoustic modeling is to estimate the parameters of a particular phoneme model using speech data from all supported languages that include this phoneme. Multilingual speech recognition is very attractive as it makes a particular speech recognition application usable by a much wider audience. In addition the logistic needs is reduced when making world wide products. Furthermore, sharing of phoneme models across languages can significantly reduce memory requirements compared to using separate models for each language. Multilingual recognizers are thus very attractive for portable platforms with limited resources.

Even though multilingual acoustic modeling has proven efficient, user definable vocabularies typically still require language dependent TTP modules for each supported language. Prior to running the language dependent TTP module it is furthermore necessary to first identify the language ID of each vocabulary entry.

Language Dependent Text-To-Phoneme (TTP) Mapping

For applications like speaker independent name dialling on mobile phones the vocabulary entries are typically names in the phonebook database 21 that may be changed at any time. Thus, for a multilingual speaker independent name dialler 22 to work with language dependent TTP, a language identification module (LID) 30 is needed. An example of a multilingual speech recognition system according to prior art using a LID module 30 is shown in FIG. 3. In FIG. 3 it is shown how the LID module 30 selects a language dependent TTP module 31.1–31.$n$ that is used for generating the pronunciation by means of a pronunciation lexicon module 32 for a multilingual recognizer 33 based on multilingual acoustic phoneme models.

The LID module 30 may be a statistical model predicting the language ID of each entry in the vocabulary, a deterministic module that sets the language ID of each entry based on application specific knowledge, a module that simply requires the user to set the language ID manually or a combination of these. In the most general case, a priori knowledge about the language ID is not available and manual language identification by the user may not be desirable. In that case, language identification must be based on a statistical LID module that predicts the language ID from the written text.

Depending on the application, the TTP module 31.1–31.$n$ may be a statistical model, a rule based model, based on a lookup table that contains all possible words, or any combination of these. The latter approach will typically not be possible for name dialing applications on portable devices with limited memory resources, due to the large number of possible names.

In most applications based on user defined vocabularies, a statistical LID module 30 has very limited text data for deciding the language ID of an entry. For e.g. a short name like "Peter", only five letters are available for language identification. Furthermore, many names are not unique for a single language but rather used in a large number of languages with different pronunciations. In addition to this, a speaker may pronounce a foreign/non-native name with a significant accent, i.e., the pronunciation of the name is actually a mixture of the pronunciation corresponding to the language from which the name originates and the native language of the speaker.

This implies that the combination of language dependent TTP modules 31.1–31.$n$, a statistical LID module 30 and multilingual acoustic phoneme model is likely to give a poor overall performance. Furthermore, if several languages are to be supported in a portable device, the size of the LID and TTP modules may have to be severely limited in order to fit into the low memory resources of the device. For "irregular" languages, like English, high accuracy TTP modules may take up as much as 40–300 kb of memory, whereas TTP modules for rule based "regular" languages like Japanese and Finnish typically require less than 1 kb.

SUMARY OF THE INVENTION

According to a first aspect of the invention there is provided a method of speech recognition in order to identify a speech command as a match to a written text command, and comprising steps of providing a text input from a text database, receiving an acoustic input, generating a sequence of multilingual phoneme symbols based on said text input by means of a multilingual text-to phoneme module, generating pronunciations in response to said sequences of multilingual phoneme symbols, and comparing said pronunciations with the acoustic input in order to find a match.

According to a second aspect of the invention there is provided a system for speech recognition and comprising a text database for providing a text input, transducer means for receiving an acoustic input, a multilingual text-to phoneme module (language independent) for outputting a sequences of multilingual phoneme symbols based on said text input, pronunciation lexicon module receiving said sequences of multilingual phoneme symbols from said multilingual text-to phoneme module, and for generating pronunciations in response thereto, and a multilingual recognizer based on multilingual acoustic phoneme models for comparing said pronunciations generated by the pronunciation lexicon module with the acoustic input in order to find a match.

According to a third aspect of the invention there is provided a communication terminal having a speech recognition unit comprising a text database for providing a text input, transducer means for receiving an acoustic input, a multilingual text-to phoneme module for outputting a sequence of multilingual phoneme symbols based on said text input, pronunciation lexicon module receiving said sequences of multilingual phoneme symbols from said multilingual text-to phoneme module, and for generating pronunciations in response thereto, and a multilingual recognizer based on multilingual acoustic phoneme models for comparing said pronunciations generated by the pronunciation lexicon module with the acoustic input in order to find a match.

According to the invention, there is provided a novel approach denoted multilingual TTP (ML-TTP) for generating pronunciations from written text on-the-fly in a multilingual speech recognition system is disclosed. The ML-TTP approach removes the need of using a language identification (LID) module and allows for more variation in the pronunciation of vocabulary entries when combined with a weighted branched grammar decoding scheme.

By using the multilingual TTP model according to the invention, the need for language identification is removed as the text is mapped to a multilingual phoneme string irrespective of language ID.

BRIEF DESCRIPTION OF THE DRAWINGS

For a better understanding of the present invention and to understand how the same may be brought into effect reference will now be made, by way of example only, to accompanying drawings, in which.

DETAILED DESCRIPTION OF THE INVENTION

Figure 1:
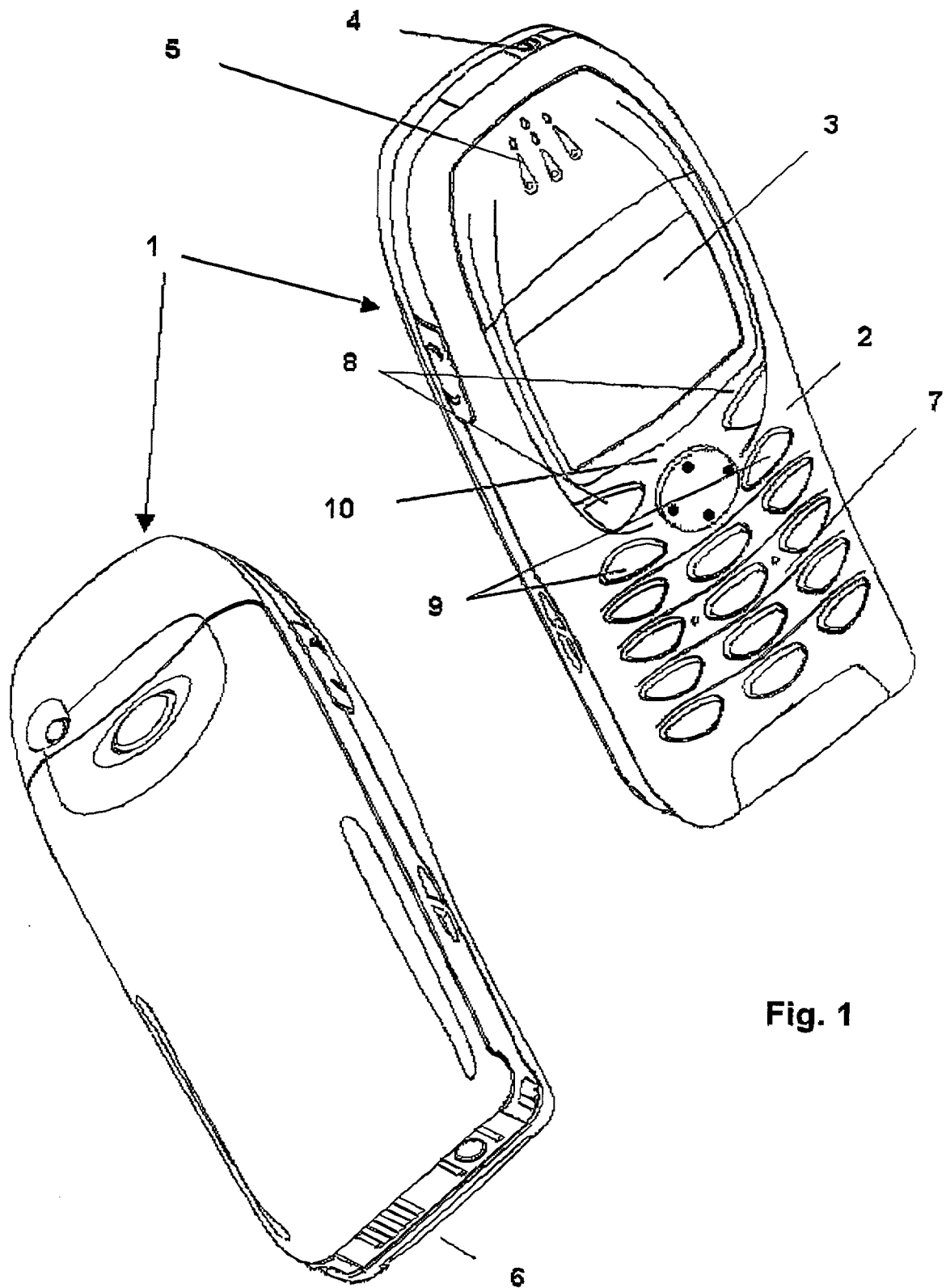
FIG. 1 schematically illustrates a preferred embodiment of a hand portable phone according to the invention.

FIG. 1 shows a preferred embodiment of a phone according to the invention, and it will be seen that the phone, which is generally designated by 1, comprises a user interface having a keypad 2, a display 3, an on/off button 4, a speaker 5 (only openings are shown), and a microphone 6 (only openings are shown). The phone 1 according to the preferred embodiment is adapted for communication preferable via a cellular network e.g. GSM.

According to the preferred embodiment the keypad 2 has a first group 7 of keys as alphanumeric keys, two soft keys 8, and a four way navigation key 10. Furthermore the keypad includes two call-handling keys 9 for initiating and terminating calls. The present functionality of the soft keys 8 is shown in a separate field in the bottom of the display 3 just above the keys 8. This key layout is characteristic of e.g. the Nokia 6210™ phone.

Figure 2:
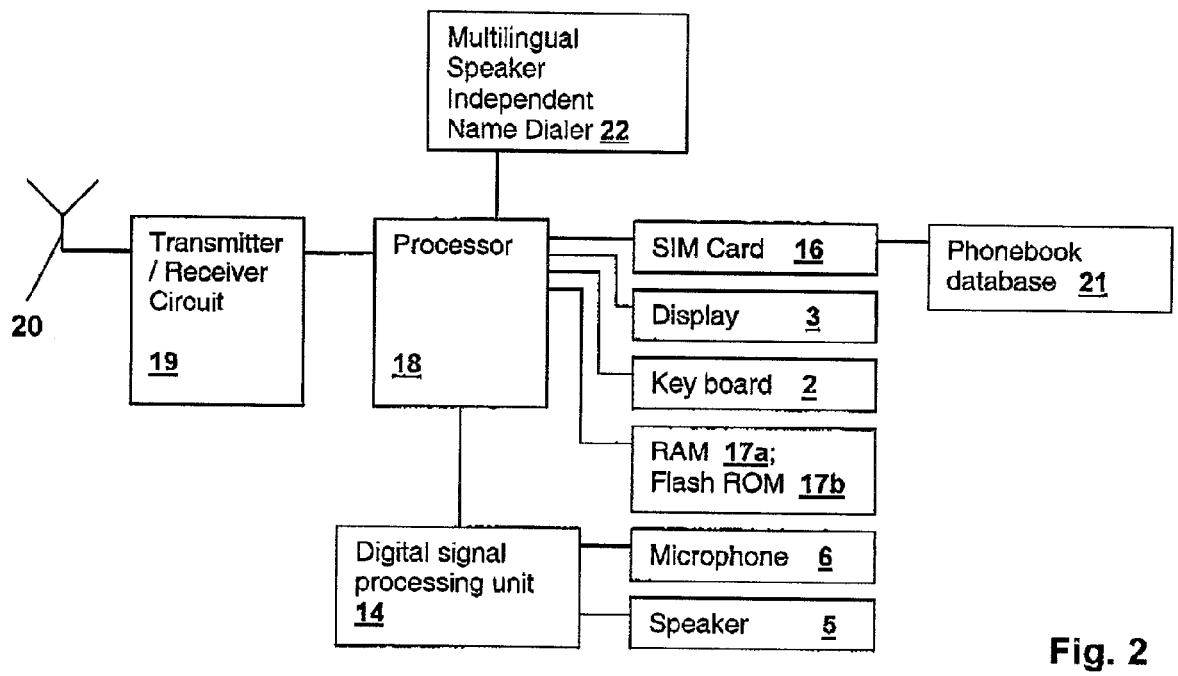
FIG. 2 schematically shows the essential parts of a telephone for communication with e.g. a cellular network.
Figure 3:
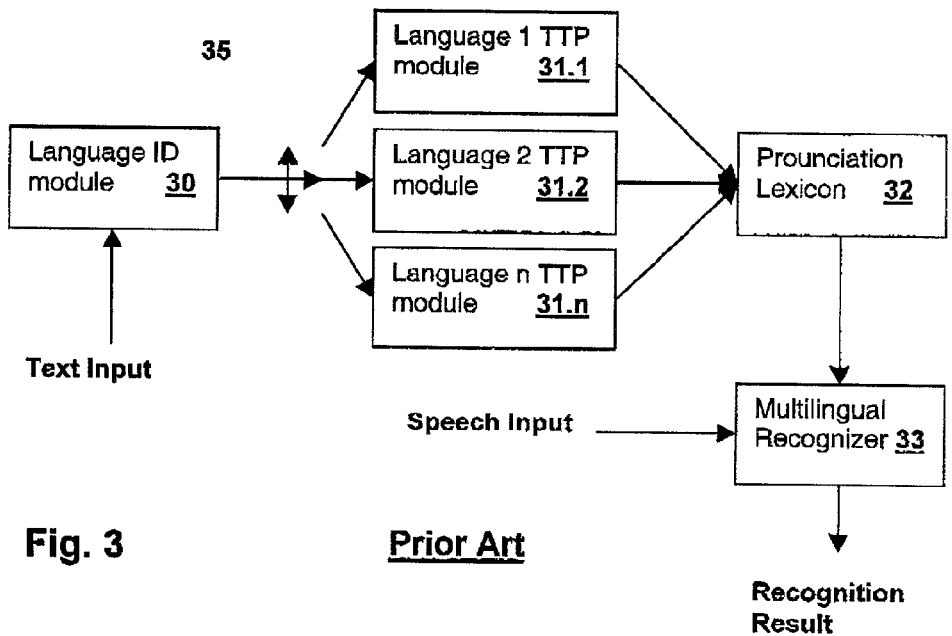
FIG. 3 shows as a block diagram a multilingual speech recognition system employing a LID module and language specific TTP modules according to prior art.

FIG. 2 schematically shows the most important parts of a preferred embodiment of the phone, said parts being essential to the understanding of the invention. A processor 18, which i.a. supports the GSM terminal software, controls the communication with the network via the transmitter/receiver circuit 19 and an antenna 20.

The microphone 6 transforms the user's speech into analogue signals; the signals formed thereby are A/D converted in an A/D converter (not shown) before the speech is encoded in an audio part 14. The encoded speech signal is transferred to the processor 18. The processor 18 also forms the interface to a RAM memory 17a and a Flash ROM memory 17b, a SIM card 16, the display 3 and the keypad 2 (as well as data, power supply, etc.). The SIM card 16 includes an electronic phonebook database 21 containing name labels and associated phone numbers. The audio part 14 speech-decodes the signal, which is transferred from the processor 18 to the earpiece 5 via a D/A converter (not shown).

A multilingual speaker independent name dialler 22 receives an audio input from the microphone 6 via the processor 18. The multilingual speaker independent name dialler 22 compares the audio input with the text strings form by the name labels in the phonebook 21 to find match and initiates that the phone calls the phone number associated with the matching name label.

Multilingual TTP Mapping

Figure 4:
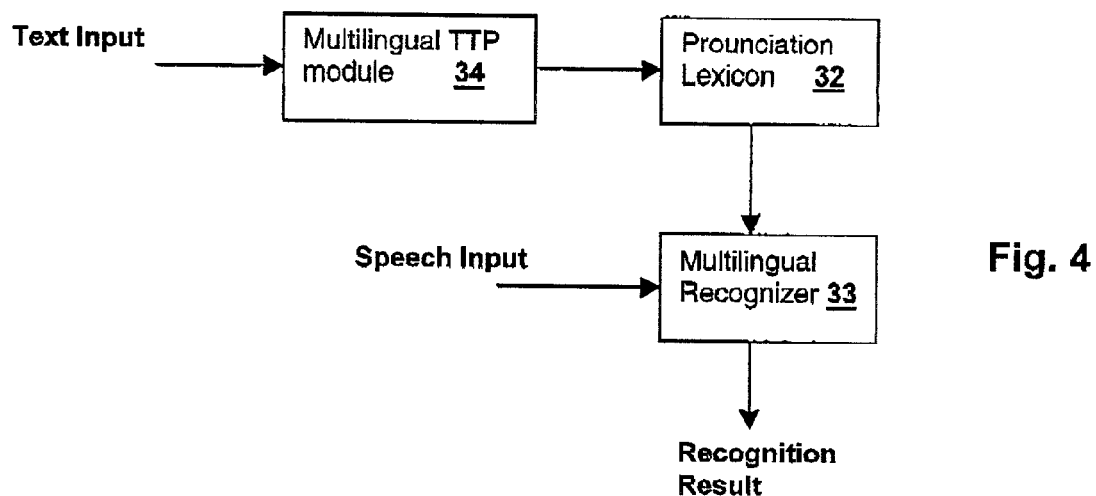
FIG. 4 shows as a block diagram a multilingual speech recognition system employing a Multilingual TTP module according to a preferred embodiment of the invention.

According to the invention a single TTP module 34 is used for mapping text directly into pronunciations based on a common multilingual phoneme set in the pronunciation lexicon module 32. That is, the multilingual TTP module 34 outputs a sequence of multilingual phoneme symbols based on written text as input, see FIG. 4. This sequence of multilingual phoneme symbols is used for generating the pronunciation by means of a pronunciation lexicon module 32 for a multilingual recognizer 33 based on multilingual acoustic phoneme models.

The basic idea is, just as for multilingual acoustic modelling, to observe that a number of phonemes are shared among different languages. Often the same mapping between letters and phonemes exist in several languages, e.g. the letter "p" maps to the phoneme "p" (SAMPA notation) in most contexts for both English, German, Finnish and Spanish. By using the same model for similar mappings, savings in parameters can be obtained compared to using a separate TTP model for each language.

Figure 5:
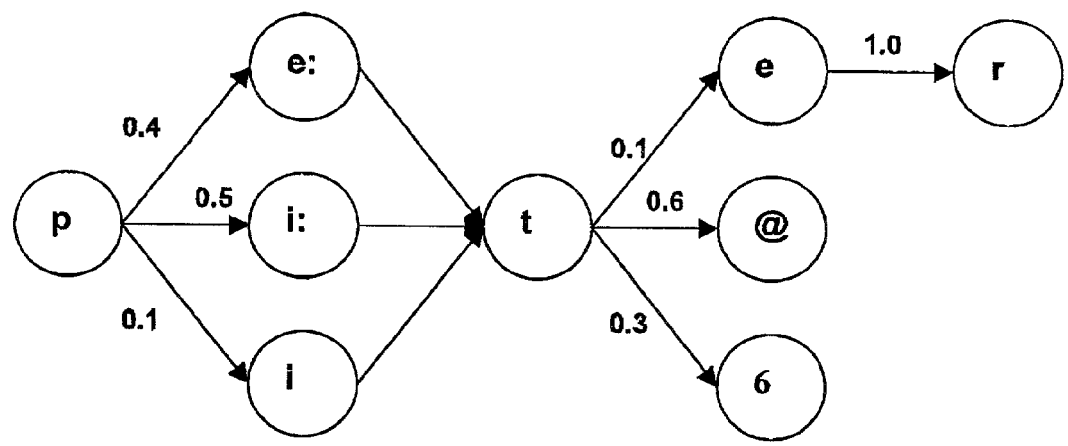
FIG. 5 shows a branching diagram according to the preferred embodiment of the invention for pronunciation of name "Peter" in German (p-e:-t-6), English (o-i:-t-@) and Spanish (p-i-t-e-r) arranged as a branched grammar. The values on the arcs between phonemes indicate probabilities of the phonemes as provided by e.g. the TIP module. SAMPA notation is used for phonemes.

Naturally, some letters are pronounced quite differently for different languages. The ML-TTP approach (FIG. 4) will therefore only be successful if the ML-TTP module 34 is capable of producing multiple, alternative phoneme symbols for such letters. The alternative phonemes are then used to create a branched grammar. The principle of branched grammar decoding in combination with a multilingual TTP module 34 is illustrated for the name "Peter" in FIG. 5. The name "Peter" is pronounced quite differently in different languages, but using a multilingual TTP module 34 along with branched grammar decoding allows for capturing all pronunciations that are allowed in the set of languages supported by the multilingual recognition system. The different phonemes at each position can be weighted with probabilities as given by the multilingual TTP model, see FIG. 5. This is possible when using e.g. neural networks for TTP as they can directly give estimates of the posterior probabilities of the different phonemes for each letter input.

It should be noted at this point, that when a Viterbi decoding scheme is used, only one of the possible phonemes are selected at each position during acoustic decoding. However, if an all-path forward decoder is used, all phonemes at a given position gives a weighted contribution to the score of the word, see FIG. 5. Thus, a forward decoding scheme will in principle allow pronunciations that are a mixture of several different pronunciations.

Experiments

The ML-TTP method for transcribing written text into phonemes has been compared to a number of alternative TTP methods in a multilingual speaker independent name dialling task. Four languages, Finnish, German, English (US and UK), and Spanish, where used for design and evaluation of the overall system. For these four languages the total number of mono-phonemes is 133 corresponding to 39 phonemes for English, 28 for Spanish, 43 for German and 23 for Finnish. However, by defining a common multilingual phoneme set sharing similar phonemes, the total number of mono-phonemes can be reduced to 67 without affecting overall system performance. For testing of the overall system recognition rate a in-house test performed by the assignee of the present patent application set for each of the four languages was used. The test set for each language was based on a 120 word vocabulary of names (90 full names, 10 given names and 20 foreign names). The total number of test utterances was 21900: 5038 for UK English, 5283 for Spanish, 7979 for German and 3600 for Finnish.

A short description of the TTP, LID and multilingual acoustic model architecture, set-up, and training is provided below.

TTP Mapping Module

Four different approaches for TTP mapping have been considered in this work:

TABLE 1

TTP training set sizes, model architectures, and model sizes. The number of input, hidden, and output units in the fully connected MLPs are denoted by I, H, and O respectively.

| Language | No. words | I × H × O | Model size |
|---|---|---|---|
| UK + US | 197 277 | 243 × 104 × 46 | 30 kb |
| German | 255 280 | 217 × 38 × 47 | 10 kb |
| Spanish | 36 486 | 102 × 5 × 32 | 0.7 kb |
| Finnish | 15 103 | 72 × 4 × 25 | 0.4 kb |
| ML | 882 915 | 333 × 99 × 73 | 40 kb |

TrueTTP: true (handmade) phoneme transcriptions. This represents the "ideal" case where a lexicon covering all possible words used in the application is available.

noLID: language specific TTP modules assuming that the language ID of each word in the vocabulary is known a priori. The language ID can e.g. be set manually by the user or based on specific knowledge about the application.

LID: language specific TTP modules in combination with a statistical LID module for setting the language ID of each vocabulary word. Note that for vocabulary entries composed of several words (e.g. first and last name) the language ID is set separately for each word.

ML-TTP: multilingual TTP.

Instead of using a LID module 30 or assuming that the language ID is known beforehand, a pronunciation for each supported language could be generated for each word. Similarly, for some applications it makes sense to include pronunciations not only for the language selected by the LID module but also for languages known a priori to be very likely for the particular application. Such methods may, however, lead to a significant increase in real-time decoding complexity as the active vocabulary is "artificially" increased—especially when many languages are supported by the system.

There are several possible strategies for statistical TTP models including e.g. decision trees and neural networks. In this work, standard fully connected feed-forward multi-layer perceptron (MLP) neural networks have been chosen for the TTP module. The TTP networks take a symmetrical window of letters as input and gives a probability for the different phonemes for the central letter in the window. At each position in the window, the letter is encoded as an orthogonal binary vector in order to avoid introducing artificial correlations between letters.

All neural network TTP modules were designed to take up roughly the same amount of memory. Thus, the four language dependent TTP models use a total of 40 kb of memory (with 8 bit/parameter precision), which is the same amount used by the ML-TTP model. The language dependent TTP modules where trained by standard back-propagation using language specific lexicons and the ML-TTP module was trained on a balanced multilingual lexicon containing roughly equal amounts of data from each of the four languages. The size of the training databases, the architecture and the size of the TTP networks are given in Table 1. All training material was taken from the following pronunciation lexicons: BeepDic (UK), CmuDic (US), LDC-CallHome-German, LDC-CallHome-Spanish, SpeechDat-Car-Finnish transcriptions.

For all TTP methods except the TrueTTP method both single pronunciations (no branching) and branched grammars have been tested. For the branched grammars, the number of branches at each position was hard limited to a maximum of 5 and 70% of the phoneme posterior probability mass was included at each position. With this scheme, the real-time decoding complexity is increased by 10–25% corresponding to an increase of 10–25% in the number of phonemes compared to a lexicon without branching. The largest increase of 25% was observed for the ML-TTP approach. Due to pronunciation variation among different languages a larger number of branches are needed on average at each position in order to include 70% of the posterior probability mass.

LID Module

As for the TTP model there are several possible choices for the statistical LID module, e.g. N-grams [1], decision trees [3], and neural networks. In a set of initial experiments, a neural network based LID module was found to have a very good generalization ability for LID classification from short segments of text even for very compact network sizes. Consequently, a standard fully connected feed-forward MLP network was selected for LID classification. The LID neural network takes a symmetrical window of letters as input and gives probabilities for each of the possible languages at the output for the central letter in the window. The overall language probabilities for a given word was computed as a geometrical average over the language probabilities for all letters in the word. The "winning language" for a word was selected as the one with the largest overall probability.

A LID module with four outputs, 10 hidden units and 333 inputs was trained by standard back-propagation on a balanced set of 50 317 words—roughly 12 500 words from each of the four languages. All words where picked at random from the pronunciation lexicons used for training the TTP modules. With 8 bit/parameter precision, this LID module has a size of 10 kb. On an independent test set of 124 907 Finnish, German, English, and Spanish words the 10 kb LID model gives a classification rate of 86.4% on average.

Multilingual Acoustic Module

The acoustic phoneme models where based on a HMM/NN hybrid known as Hidden Neural Networks (HNN). The basic idea in the HNN architecture is to replace the Gaussian mixtures in each state of an HMM by state specific MLPs that have a single output and take speech feature vectors as input. A set of 67 multilingual 3-state mono-phoneme HNNs where discriminatively trained on 6965 Spanish, 9234 German, 5611 Finnish, 6300 US English, and 9880 UK English utterances taken from the Spanish-VAHA, SpeechDat-AustrianGerman, SpeechDat-Car-Finnish, Timit and WSJ-CAMO databases, respectively. The number of hidden units in the network associated with a state in a particular phoneme HNN was selected based on the following heuristics: for phonemes used by a single language, zero hidden units are used. For phonemes shared by two or more languages the number of hidden units is equal to the number of languages sharing the phoneme. With 8 bit/parameter precision this results in a total size of 17 kb for the acoustic models.

Before training, the utterances where mixed with 3 different types of noise (car, café, music) at SNRs in the range 5–20 dB in order to increase noise robustness of the acoustic models.

The noise mixed training files where passed through a standard MFCC pre-processor yielding 13 static, delta and delta-delta coefficient each 10 ms. Each coefficient in the 39 dimensional feature vector was normalized to zero mean and all coefficients corresponding to the log energy were normalized to unit variance.

During decoding of the HNN, a forward decoder was applied. This has been observed to yield a better performance than Viterbi decoding when the acoustic models are trained discriminatively. Furthermore, the all-path forward decoding scheme is more appropriate for branched grammars as described above.

TABLE 2

Word recognition rates for various TTP methods in a multilingual speaker independent name dialing application. A single transcription is used for all entries in the vocabulary.

| Single | True | noLID | LID | ML |
|---|---|---|---|---|
| UK English (5038) | 92.6 | 87.8 | 79.7 | 82.2 |
| German (7979) | 95.2 | 92.2 | 86.0 | 87.4 |
| Spanish (5283) | 95.4 | 94.3 | 91.8 | 92.3 |
| Finnish (3600) | 99.1 | 98.9 | 98.5 | 98.3 |
| Average | 95.6 | 93.3 | 89.0 | 90.1 |

TABLE 3

Word recognition rates for various TTP methods in a multilingual speaker independent name dialing application. Branched grammars are used during decoding.

| Branched | True | noLID | LID | ML |
|---|---|---|---|---|
| UK English (5038) | 92.6 | 91.6 | 81.4 | 85.8 |
| German (7979) | 95.2 | 93.5 | 88.7 | 92.5 |
| Spanish (6283) | 95.4 | 94.5 | 93.0 | 96.2 |
| Finnish (3600) | 99.1 | 98.9 | 98.7 | 98.8 |
| Average | 95.6 | 94.6 | 90.5 | 93.3 |

Even though the acoustic models have been trained using data from the above mentioned languages, they have been observed to give good performance for many other languages based on phonemes contained in the 67 multilingual phoneme set. A similar observation has been done for a HMM based multilingual system built on the same set of 67 multilingual phonemes.

Results

The results presented below gives the overall speech recognition performance when using the TTP methods described above for transcribing text in combination with the multilingual HNN speech recognizer.

Table 2 shows the performance when using the different TTP methods for each of the four test languages when a single pronunciation is used for each entry in the vocabulary (no branched grammar decoding). The column "TrueTTP" shows the performance obtained using hand-transcriptions, "noLID", the performance obtained assuming known language ID of each entry and language specific TTP modules, and "LID" the performance obtained when using a LID module in combination with language dependent TTP modules. The last column in the table shows the performance of a system employing a multilingual TTP module.

As seen from table 2, the true transcriptions are clearly superior for all languages. However, for applications intended for portable devices, there is usually not room for storing a complete dictionary so the TTP mappings must be based on a more compact statistical method. Comparing the rows entitled "no-LID" and "LID" it is evident that the errors in language ID introduced by the statistical LID module seriously hampers the recognition performance. Thus, even with a LID module that gives a fairly accurate language identification, the performance of the overall system is seriously affected by incorrect language identification for a few words.

Table 3 illustrates the effect of applying the different statistical TTP modules with a branched grammar decoding scheme. As seen all methods gain a lot from branched grammar decoding and for the Spanish test, the ML-TTP module in combination with branched grammar decoding even outperforms the true TTP transcriptions. This indicates that an ML-TTP model allows for more variation in the pronunciation of words and thereby increases recognition performance. Interestingly, the multilingual TTP model is capable of giving almost the same performance on average for the four languages as the combination of manually set language ID and language dependent TTP (noLID).

Table 4 illustrates the average performance over the four languages when testing in various noise environments with different TTP mapping methods. As can be seen, the gain due to branched grammar decoding and multilingual TTP is maintained in noise.

TABLE 4

Average performance over Finnish, German, Spanish, and English for various TTP methods in a multilingual speaker independent name dialing application in various noise environments at 10 dB SNR. Branched grammars were applied during decoding.

| Noise type | True | noLID | LID | ML |
| --- | --- | --- | --- | --- |
| Clean | 95.6 | 94.6 | 90.5 | 93.3 |
| Volvo80 | 92.3 | 90.6 | 85.6 | 88.6 |
| Babble | 87.6 | 84.8 | 80.0 | 82.6 |
| Pop Music | 83.2 | 79.8 | 74.5 | 77.0 |

According to the invention there is provided a novel approach for generating multilingual text-to-phoneme mappings for use in multilingual speech recognition systems. The approach is based on the ability of the statistical TTP module to generate a weighting of the phonemes at each position. Here we have used the phoneme posterior probabilities provided by a feed-forward neural network, trained on data mixed from several languages.

The set of weighted phonemes at each position are used to create a branched grammar, using all-path forward decoding. The branched grammar allows for capturing of both inter- and intra-language pronunciation variations.

Tests showed that the multi-lingual TTP approach along with the branched grammar offers a significant improvement in recognition performance in multi-lingual phoneme based speaker independent speech recognition compared to using language dependent TTP modules in combination with a LID module. In some cases the multi-lingual TTP approach even improved recognition performance compared to when the language ID was known a priori.

What is claimed is:

1. A method of speech recognition in order to identify a speech command as a match to a written text command comprising the steps:
providing a text input from a text database;
receiving an acoustic input;
generating sequences of multilingual phoneme symbols based on said text input by means of a multilingual text-to-phoneme module;
generating variations of pronunciations which are recognizable in response to said sequences of multilingual phoneme symbols determined by use of a branched grammar; and
comparing said variations of pronunciations with the acoustic input in order to find a match.

2. A method according to claim 1 wherein the text input is processed letter by letter, and wherein a neural network provides an estimate of the posterior probabilities of the different phonemes for each letter.

3. A method according to claim 1 comprising deriving said text input from a database containing user entered text strings.

4. A method according to claim 1, wherein generating variations of pronunciations determined by use of a branched grammar comprises use of a weighted branched grammar in which the weightings are representative of probabilities of the phonemes of said sequences of multilingual phoneme symbols.

5. A method according to claim 1, wherein said sequences of multilingual phoneme symbols comprise a complete and non-redundant set of multilingual phoneme symbol sequences for languages supported by said multilingual text-to-phoneme module.

6. A method according to claim 1, wherein generating sequences of multilingual phoneme symbols comprises generating a weighted branched grammar in which the weightings are representative of probabilities of the phonemes of said sequences of multilingual phoneme symbols.

7. A method according to claim 1, wherein generating variations of pronunciations determined by use of a branched grammar comprises capturing intra-language and inter-language pronunciation variations of said text input in said branched grammar of said sequences of multilingual phoneme symbols.

8. A system for speech recognition comprising:
a text database for providing a text input;
transducer means for receiving an acoustic input;
a multilingual text-to-phoneme module for outputting sequences of multilingual phoneme symbols based on said text input;
a pronunciation lexicon module receiving said sequences of multilingual phoneme symbols from said multilingual text-to-phoneme module, and for generating variations of pronunciations which are recognizable in response thereto which are determined by a branched grammar; and
a multilingual recognizer based on multilingual acoustic phoneme models for comparing said variations of pronunciations generated by the pronunciation lexicon module with the acoustic input in order to find a match.

9. A system according to claim 8, wherein the multilingual text-to phoneme module processes said text input letter by letter, and comprises a neural network for giving an estimate of the posterior probabilities of the different phonemes for each letter.

10. A system according to claim 9 wherein the neural network is a standard fully connected feed-forward multilayer perceptron neural network.

11. A system according to claim 8 wherein the text input is derived from a database containing user entered text strings.

12. A system according to claim 11 wherein the database containing user entered text strings is an electronic phonebook including phone numbers and associated name labels.

13. A system according to claim 8, wherein said pronunciation lexicon module uses a weighted branched grammar for determining variations of pronunciations in which the weightings are representative of probabilities of the phonemes of said sequences of multilingual phoneme symbols.

14. A system according to claim 8, wherein said multilingual text-to-phoneme module generates said sequences of multilingual phoneme symbols to correspond to a complete and non-redundant set of multilingual phoneme symbol sequences for languages supported by said multilingual text-to-phoneme module.

15. A system according to claim 8, wherein said multilingual text-to-phoneme module outputs the sequences of multilingual phoneme symbols in a weighted branched grammar in which the weightings are representative of probabilities of the phonemes of said sequences of multilingual phoneme symbols.

16. A system according to claim 8, wherein said pronunciation lexicon module captures intra-language and inter-language pronunciation variations of said text input in said branched grammar of said sequences of multilingual phoneme symbols.

17. A communication terminal including a speech recognition unit comprising:
   a text database for providing a text input;
   transducer means for receiving an acoustic input;
   a multilingual text-to-phoneme module for outputting sequences of multilingual phoneme symbols based on said text input;
   a pronunciation lexicon module receiving said sequences of multilingual phoneme symbols from said multilingual text-to phoneme module, and for generating variations of pronunciations in response thereto which are determined by a branched grammar; and
   a multilingual recognizer based on multilingual acoustic phoneme models for comparing said variations of pronunciations generated by the pronunciation lexicon module with the acoustic input in order to find a match.

18. A communication terminal according to claim 17, wherein the multilingual text-to phoneme module processes said text input letter by letter, and comprises a neural network for giving an estimate of the posterior probabilities of the different phonemes for each letter.

19. A communication terminal according to claim 18 wherein the neural network is a standard fully connected feed-forward multi-layer perceptron neural network.

20. A communication terminal according to claim 17 wherein the text input is derived from a database containing user entered text strings.

21. A communication terminal according to claim 20 wherein the database containing user entered text strings is an electronic phonebook including phone numbers and associated name labels.

22. A communication terminal according to claim 17, wherein said pronunciation lexicon module uses a weighted branched grammar for determining variations of pronunciations in which the weightings are representative of probabilities of the phonemes of said sequences of multilingual phoneme symbols.

23. A communication terminal according to claim 17, wherein said multilingual text-to-phoneme module generates said sequences of multilingual phoneme symbols to correspond to a complete and non-redundant set of multilingual phoneme symbol sequences for languages supported by said multilingual text-to-phoneme module.

24. A communication terminal according to claim 17, wherein said multilingual text-to-phoneme module outputs the sequences of multilingual phoneme symbols in a weighted branched grammar in which the weightings are representative of probabilities of the phonemes of said sequences of multilingual phoneme symbols.

25. A communication terminal according to claim 17, wherein said pronunciation lexicon module captures intra-language and inter-language pronunciation variations of said text input in said branched grammar of said sequences of multilingual phoneme symbols.

* * * * *